United States Patent [19]

Landt

[11] 4,360,810
[45] Nov. 23, 1982

[54] MULTICHANNEL HOMODYNE RECEIVER

[75] Inventor: Jeremy A. Landt, Los Alamos, N. Mex.

[73] Assignee: The United States of America as represented by the United States Department of Energy, Washington, D.C.

[21] Appl. No.: 226,283

[22] Filed: Jan. 19, 1981

[51] Int. Cl.³ .............................................. G01S 13/78
[52] U.S. Cl. ............................ 343/6.5 R; 343/5 PD; 343/6.5 SS
[58] Field of Search ................. 343/5 PD, 6.5 SS, 6.5

[56] References Cited

U.S. PATENT DOCUMENTS 3,703,722 11/1972 Gershberg et al. .............. 343/5 PD
3,728,721 4/1973 Lee et al. ......................... 343/5 PD
4,195,289 3/1980 Cole ............................. 343/5 PD X
4,200,870 4/1980 Gabbitas ......................... 343/5 PD Primary Examiner—T. H. Tubbesing
Attorney, Agent, or Firm—William W. Cochran, II; Paul D. Gaetjens; Richard G. Besha

[57] ABSTRACT

A homodyne radar transmitter/receiver device which produces a single combined output which contains modulated backscatter information for all phase conditions of both modulated and unmodulated backscatter signals. The device utilizes taps along coaxial transmission lines, strip transmission line, and waveguides which are spaced by ⅛ wavelength or 1/6 wavelength, etc. This greatly reduces costs by eliminating separate transmission and reception antennas and an expensive arrangement of power splitters and mixers utilized in the prior art.

10 Claims, 19 Drawing Figures

DISTANCE ON TRANSMISSION LINE

4,360,810

MULTICHANNEL HOMODYNE RECEIVER

BACKGROUND OF THE INVENTION

The present invention pertains generally to microwave communication systems and more particularly to radar transponder identification systems. It is a result of a contract with the Department of Energy under contract W-7405-ENG-36.

Homodyne radar systems containing a transponder for purposes such as motor vehicle identification, railroad car identification, inventory control, security systems, locating and tracking vehicles, monitoring from inaccessible locations, downed aircraft location and identification, and biomedical monitoring and identification of animals, etc., depends upon detection of the signal encoded by the transponder. A typical homodyne radar/transponder system is disclosed in FIG. 2 of U.S. Pat. No. 4,075,632 entitled "Interrogation, and Detection System" issued Feb. 21, 1978 to Baldwin et al. In operation, the transmitter/receiver, illustrated in FIG. 2 of the above-referenced patent, samples a portion of the transmitted wave using a directional coupler 40. the sampled transmitted signal is divided into two channels and phase shifted in channel A by 9°. The sampled transmitted signal is then mixed with the received signal which is also divided into two signals by signal splitter 60. After mixing the transmitted and received signals, both channels are amplified. Channel A is then phase shifted by 90° and combined with the signal of channel B to produce a single combined output channel which is filtered to detect the envelope of the coded low frequency modulated signal produced by the transponder.

Since the transponder is located on an object which may be in motion or have a position which is variable, phase differences are introduced between the sampled transmitted signal, i.e., the reference signal, and the received signal. If the reference signal is represented by $A \cos 2\pi ft$, then the received signal can be represented by $B \cos (2\pi ft + \theta)$, where A is the magnitude of the reference signal, B is the magnitude of the received signal, f is the frequency of the microwave source, t is the time in seconds, and $\theta$ is the phase difference between the reference signal and the received signal. The output of mixer B in the above-identified U.S. patent is:

$$V_{out} = A \cos (2\pi ft) \times B \cos (2\pi ft + \theta). \tag{1}$$

Using trigonometric identities:

$$V_{out} = (AB/2)[\cos \theta + \cos (4\pi ft + \theta)]. \tag{2}$$

If this signal were than filtered by a low frequency filter, such as filter 58 illustrated in FIG. 2 of the above-identified patent, the signal available to be processed digitally is:

$$V_{out} = (AB/2) \cos v. \tag{3}$$

For various phase differences between the reference signal and the receive signal, which are created by changes in the distance between the transponder and the transmitter/receiver, problems of detecting the uncoded transponder signal can develop. For example, if the phase difference $\theta = n\pi/2$ where $n = 1, 3, 5 \ldots$, then $$V_{out} = 0. \tag{4}$$

In other words, no matter how the transponder has coded the magnitude B of the received signal, no output will be detected at the receiver. These phase differences which cause a zero output are referred to as null positions or ambiguity positions. In space, the ambiguity points occur every one quarter of a wavelength. In practice, these ambiguity points result in a loss of data from the uncoded transponder signals.

These problems are overcome by the device illustrated in FIG. 2 of the above-referenced U.S. Pat. No. 4,075,632, by the introduction of a 90° phase shift of the reference signal in channel A. The two mixers illustrated in FIG. 2 produce the following outputs if each signal were filtered separately.

Mixer A output:

$$V_A = (AB/4) \cos \theta \tag{5}$$

Mixer B output:

$$V_B = (AB/4) \sin \theta \tag{69}$$

As is apparent, for all values of $\theta$, i.e., all phase differences between the reference signal and the receive signal, at least one of the two channels contains the received signal B. Of course, the same result could be achieved by introducing the 9° phase shift in either channel A or channel B.

Although this eliminates the problem of ambiguity points, the arrangement of power splitters, phase shifters, circulators, directional couplers and other devices, and the use of two antennas, results in a system which is expensive to implement. Commercialization of homodyne radar transponder identification systems would be greatly enhanced by the development of a transmitter/receiver which overcomes these problems at a reduced cost.

SUMMARY OF THE INVENTION

It is therefore an object of the present invention to provide an improved single antenna homodyne or radar system.

It is also an object of the present invention to provide an improved homodyne radar transmitter/receiver device.

Another object of the present invention is to provide a homodyne radar transmitter/receiver device for producing a single output containing modulated backscatter information for all phase conditions of both modulated and unmodulated backscatter signals.

Another object of the present invention is to provide a single antenna homodyne radar system for producing a combined output signal representative of a modulated backscatter signal produced by a transponder regardless of the ambiguity points produced by the interference of modulated and unmodulated backscatter signals.

Additional objects, advantages, and novel features of the invention are set forth in part in the description which follows, and will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the present invention as embodied and broadly described herein, the homodyne radar transmitter/receiver device of the present invention may comprise microwave source means for producing a microwave transmission signal; a combination transmitter/receiver antenna for transmitting said microwave transmission signal and detecting both modulated and unmodulated backscatter signals; transmission line means connecting said microwave source and said combination transmitter/receiver antenna; at least two output connectors attached to said transmission line means at intervals equal to approximately ⅛ wavelength of said microwave transmission signal; means for detecting attached to said output connectors; low pass filter means connected to said means for detecting; signal combiner/amplifier means connected to said low pass filter means for producing a signal output containing modulated backscatter information for all phase conditions of said modulated and unmodulated backscatter signals.

The present invention may also comprise, in accordance with its object and purposes, a homodyne radar transmitter/receiver device comprising microwave source means for producing a microwave transmission signal; a combination transmitter/receiver antenna for transmitting said microwave transmission signal and detecting both modulated and unmodulated backscatter signals; transmission line means connecting said microwave source and said combination transmitter/receiver antenna; at least three output connectors attached to said transmission line means at intervals equal to approximately 1/6 wavelength of said microwave transmission signal; means for detecting attached to said output connectors; low pass filter means connected to said means for detecting; signal combiner/amplifier means connected to said low pass filter means for producing a single output containing modulated backscatter information for all phase conditions of said modulated and unmodulated backscatter signals.

The present invention may also comprise, in accordance with its objects and purposes, a single antenna homodyne radar system for producing a combined output signal representative of a modulated backscatter signal produced by a transponder regardless of ambiguity points produced by the interference of modulated and unmodulated backscatter signals comprising rf source means for generating a microwave transmission signal; antenna means for transmitting said microwave transmission signal and receiving said modulated and unmodulated backscatter signals; transmission line means for connecting said rf source means and said antenna means such that a first standing wave pattern is produced in said transmission line means by the combination of said microwave transmission signal and said modulated backscatter signal and a second standing wave pattern is produced in said transmission line means by the combination of said microwave transmission signal and said unmodulated backscatter signal; a plurality of output channels connected to said transmission line means, said plurality of output channels spaced by a distance equal to approximately ⅛ wavelength of said microwave transmission signal such that at least one channel of each adjacent pair of said plurality of output channels contains said received modulated backscatter signal regardless of ambiguity points caused by the coincidence of said first and second standing wave patterns; means for combining said plurality of output channels to produce a single combined output channel representative of said modulated backscatter signal.

The advantages of the present device are that it provides greater sensitivity for receiving transponder signals and can be produced by inexpensive and easily implemented techniques at substantially reduced costs. This greatly enhances the commercialization of homodyne radar identification systems.

DETAILED DESCRIPTION OF THE PREFERRED EMBODIMENT OF THE INVENTION

Figure 1:
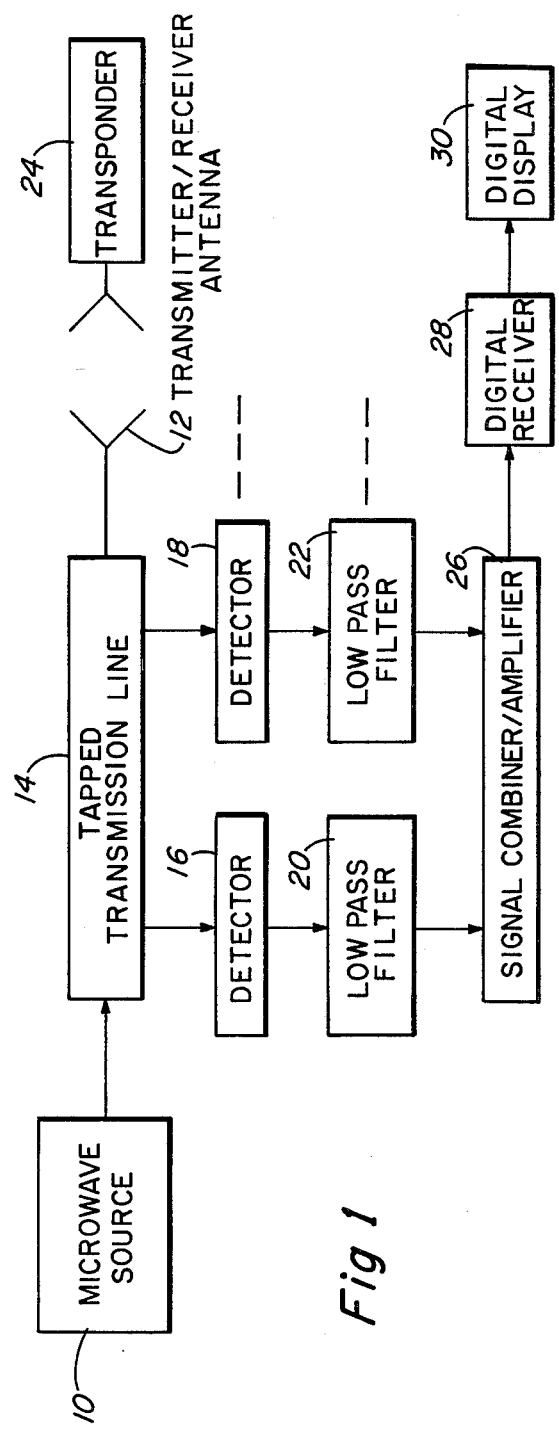
FIG. 1 is a schematic block diagram of the preferred embodiment of the invention.

FIG. 1 is a schematic block diagram of the preferred embodiment of the invention. As illustrated in FIG. 1, a microwave source 10 is connected to a transmitter/receiver antenna 12 via a tapped transmission line 14. Although the schematic block diagram of FIG. 1 illustrates two channels, a plurality of channels can be generated by connecting additional outputs to tapped transmission line 14. The spacing between connectors on the tapped transmission line 14 is ⅛ wavelength, 1/6 wavelength, or other spacing, which avoids ambiguity points described infra.

Each of the output connectors attached to the tapped transmission line 14 is connected to a detector such as detectors 16 and 18. The outputs of detectors 16 and 18 are attached to low pass filters 20 and 22. Low pass filters 20 and 22 pass the low frequency modulation information provided by transponder 24. Signal combiner/amplifier 26 combines the outputs of low pass filters 20 and 22 and amplifies the signal to a predetermined level. Digital receiver 28 converts the output of signal combiner/amplifier 26 to a pure digital signal which is displayed in digital display 30.

Figure 2:
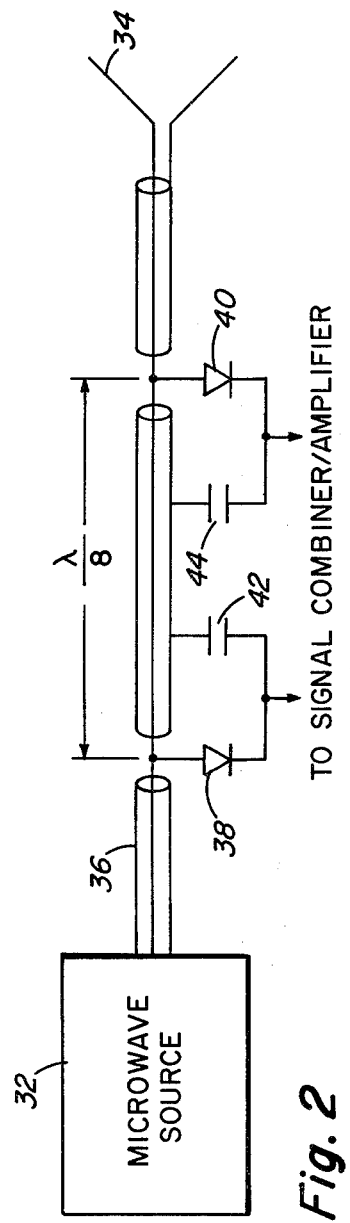
FIG. 2 is a schematic diagram of a device for implementing the preferred embodiment of the invention.

FIG. 2 illustrates a particular implementation of the device illustrated in FIG. 1. As shown in FIG. 2, a coaxial tranmission line 36 is utilized to attach the microwave source 32 to antenna 34. Taps are provided along the coaxial transmission line 36 which are spaced by ⅛ of a wavelength. Diodes 38 and 40 are utilized as detectors while capacitors 42 and 44 function as low pass filters.

Figure 3:
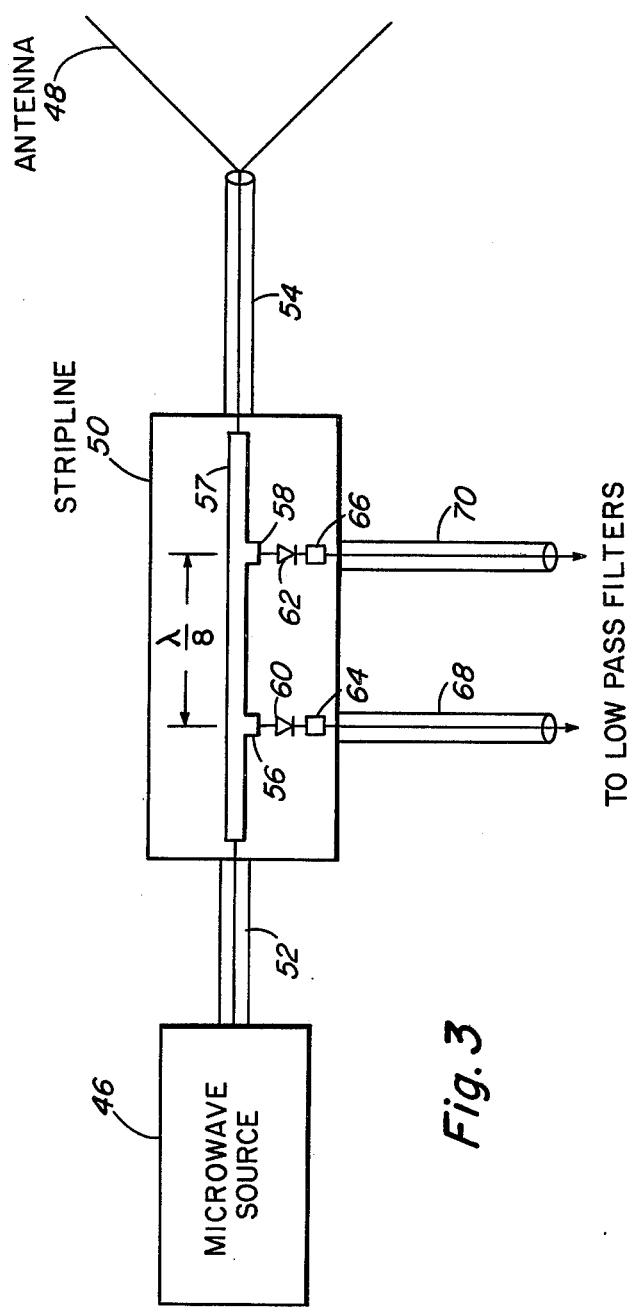
FIG. 3 is a schematic diagram of another device for implementing the preferred embodiment of the invention.

FIG. 3 illustrates another implementation of the device of FIG. 1. As shown in FIG. 3, a microwave source 46 is connected to a transmitter/receiver antenna 48 via a strip transmission line 50 and connecting cables 52 and 54. Taps 56 and 58 are attached along the strip 57 at a spacing which avoids ambiguity points, such as ⅛ wavelength. It should be noted that the wavelength of interest is the wavelength of the transmitted or received signal along the strip transmission line 50. This is additionally true for the coaxial transmission line of FIG. 2 and the waveguide illustrated in FIG. 4. Diodes 60 and 62 are attached to the taps 56 and 58, respectively. Output connecting cables 68 and 70 are attached to output strips 64 and 68. Again, FIG. 3 illustrates one manner of using a strip transmission line which produces two output channels. Also, a plurality of output channels can be produced in the same manner illustrated in FIG. 3.

Figure 4:
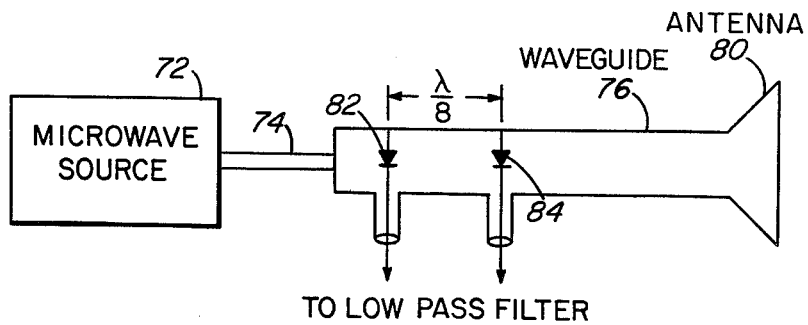
FIG. 4 is a schematic diagram of another device for implementing the preferred embodiment of the invention.

FIG. 4 illustrates another implementation of the preferred embodiment of the invention illustrated in FIG. 1. As illustrated in FIG. 4, a microwave source 72 produces a microwave signal which is transmitted through connecting cables 74 to a waveguide 76. Output detectors 82 and 84 are connected in the waveguide 76 to produce two output channels which are applied to low pass filters.

Figure 5:
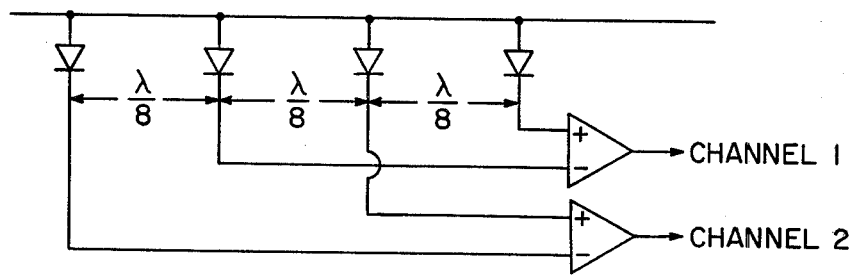
FIG. 5 is a schematic diagram of another manner of implementing the preferred embodiment of the invention.

FIG. 5 illustrates another method of implementing a plurality of output channels. The circuitry illustrated in FIG. 5 has increased rejection of noise (spurious modulation) of the transmitted rf signal.

Figure 6:
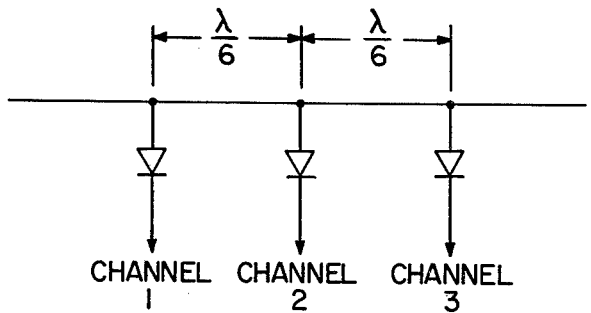
FIG. 6 is a schematic diagram of another manner of implementing the preferred embodiment of the invention.

FIG. 6 illustrates that other phasing arrangements can also be used. As shown in FIG. 6, spacings of 1/6 wavelength, using three channels, provides an output on at least two channels, at all times.

FIGS. 1–6 illustrate the preferred embodiment of the invention and various manners of implementation of the preferred embodiment of the invention. FIGS. 7–19 illustrate the operation of the invention and an inventive aspect of the invention, i.e., the ability to provide an output signal on at least one of a plurality of channels at all times.

Figure 7:
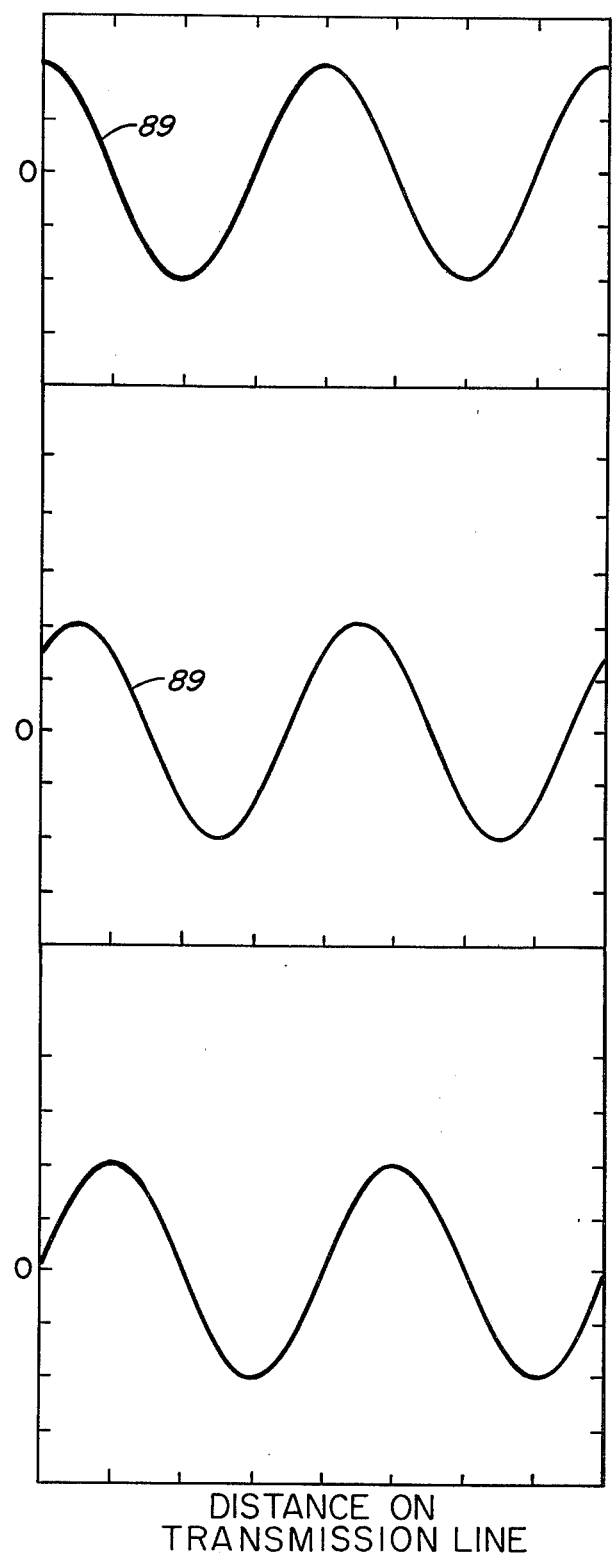
FIG. 7 is a graph of a transmitted or forward, traveling wave at three successive points in time.

FIG. 7 illustrates the transmitted wave produced by the microwave source 10 at three successive points in time. As shown in FIG. 7, the transmitted or forward wave is a traveling wave which is applied to the tapped transmission line 14 and transmitted by transmitter/receiver antenna 12 illustrated in FIG. 1. Since the forward wave illustrated in FIG. 7 is a traveling wave, it would appear on the tapped transmission line 14 (FIG. 1) as it is shown in FIG. 7 at three successive instances of time.

Figure 8:
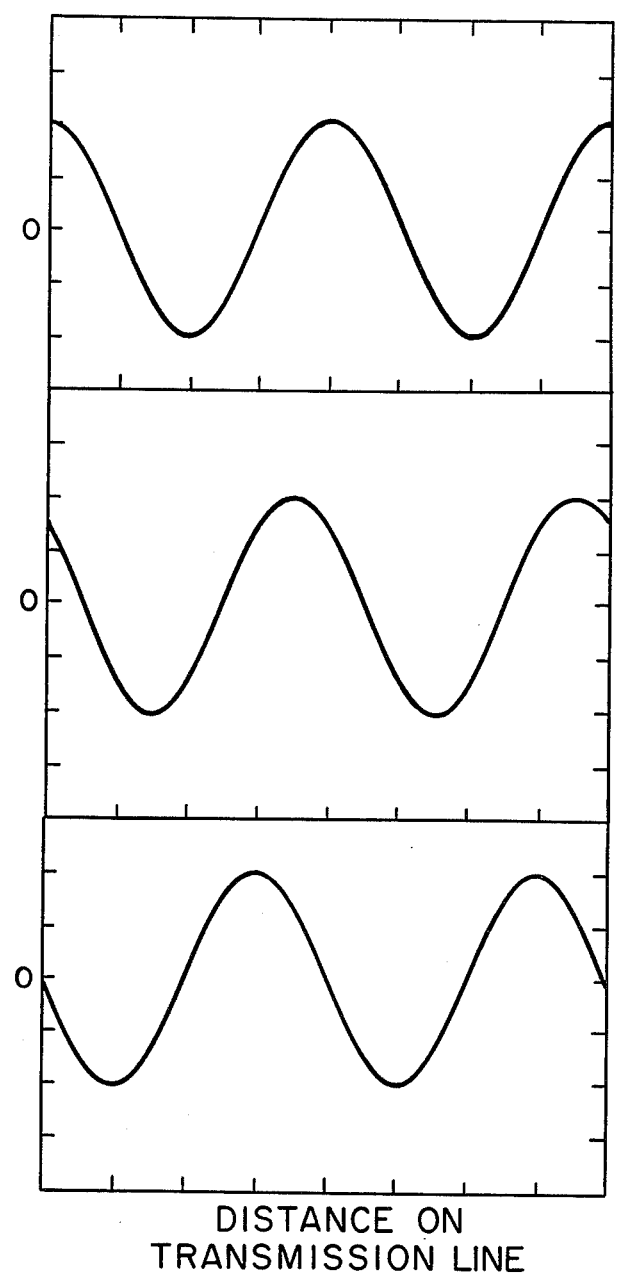
FIG. 8 is a graph of a 100% reflected traveling wave at three points in time.

FIG. 8 is an illustration of a 100% reflected traveling wave. The traveling wave illustrated in FIG. 8 can be reflected by mismatching of the impedance of the transmitter/receiver antenna 12 or radar reflection of the transmitted wave illustrated in FIG. 7 by objects in line with the transmitter/receiver antenna 12. Normally, the reflected wave in a homodyne radar system such as illustrated in FIG. 1 never approaches 100% reflection. Again, the reflected wave would appear on the tapped transmission line 14 in the manner shown in FIG. 8 at three successive instances of time.

Figure 9:
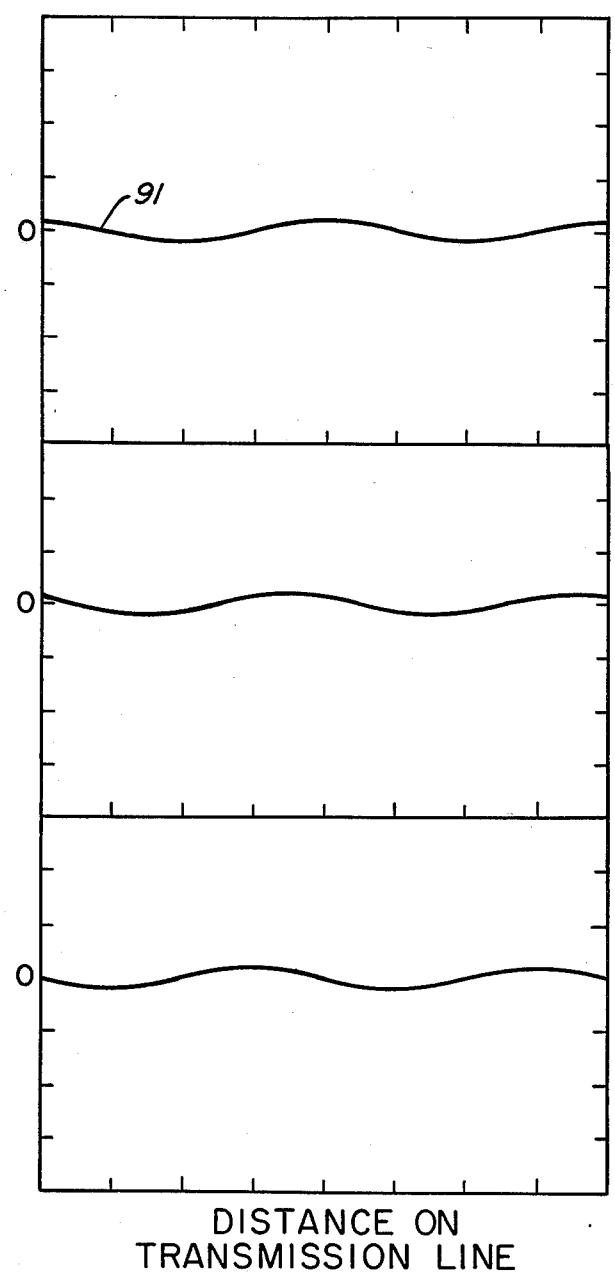
FIG. 9 is a graph of a 10% reflected wave at three points in time.

FIG. 9 is a graph of a 10% reflected wave which more accurately illustrates the type of reflected wave produced in the tapped transmission line 14.

Figure 10:
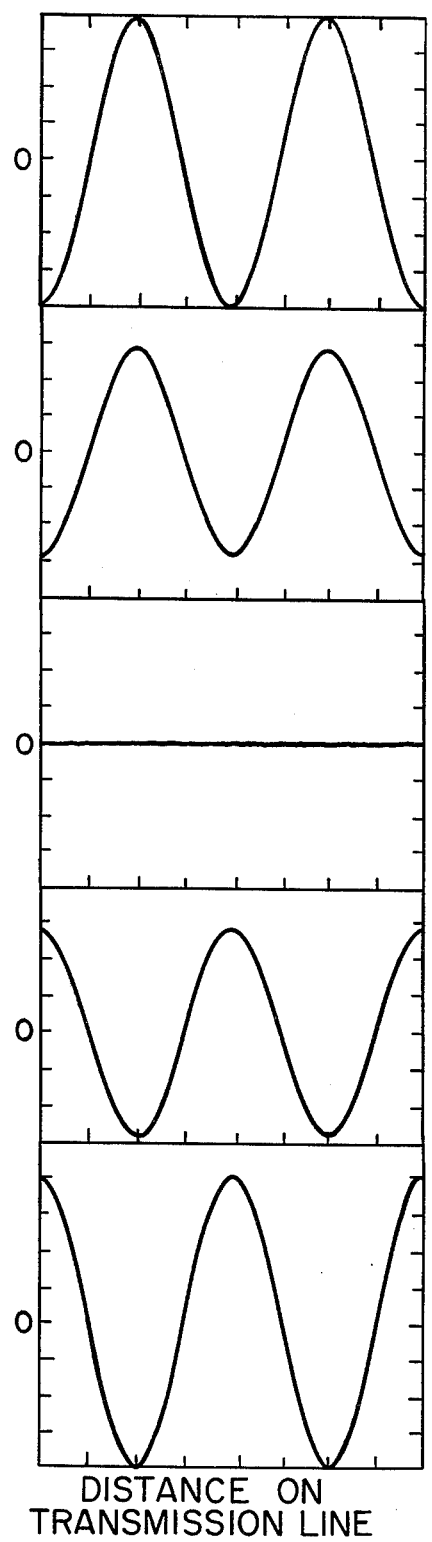
FIG. 10 is a graph of a standing wave produced by a forward traveling wave and a 100% reflected wave at five different points in time.

FIG. 10 is a schematic illustration of the standing waveform pattern produced in the tapped transmission line 14 by the interference of the transmitted or forward wave illustrated in FIG. 7 and a 100% reflected traveling wave illustrated in FIG. 8. As shown in FIG. 10 the standing waveform pattern does not travel along the tapped transmission line 14 but remains stationary and oscillates from positive to negative.

Figure 11:
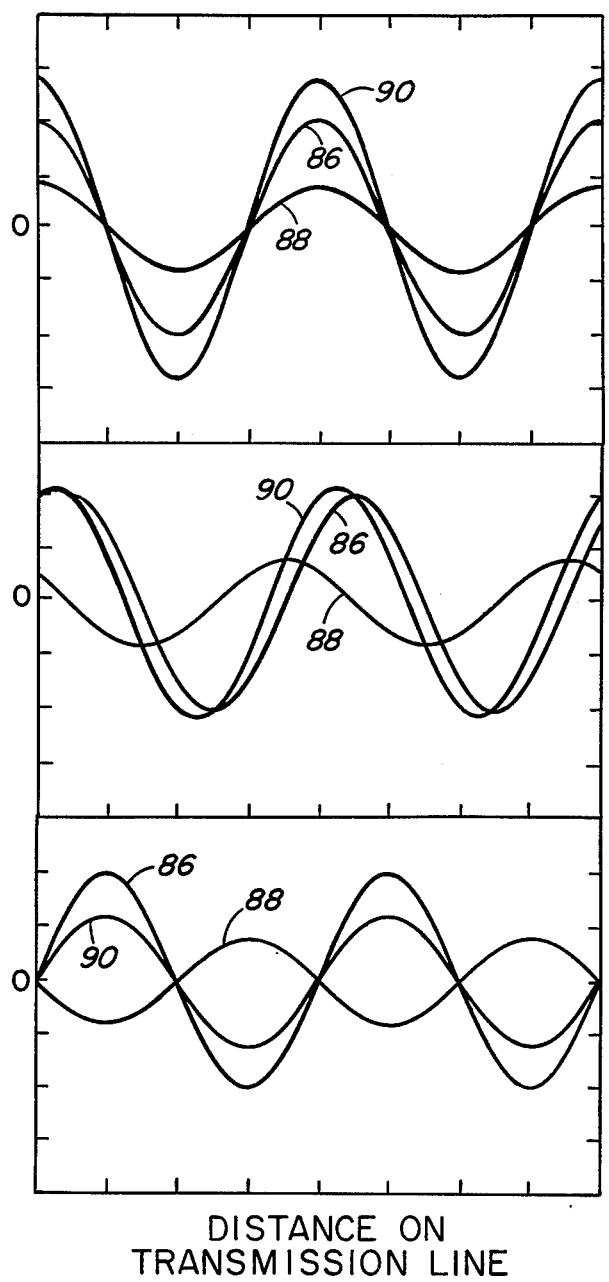
FIG. 11 is a graph of a forward traveling, a 50% reflected traveling wave and the resultant standing wave.

FIG. 11 illustrates a forward wave 86, a 50% reflected wave 88, and the resultant or standing wave 90. As is apparent from FIG. 11, the resultant waveform 90 is unlike the standing waveform illustrated in FIG. 10 in that it is a traveling wave in addition to having a variable magnitude.

Figure 12:
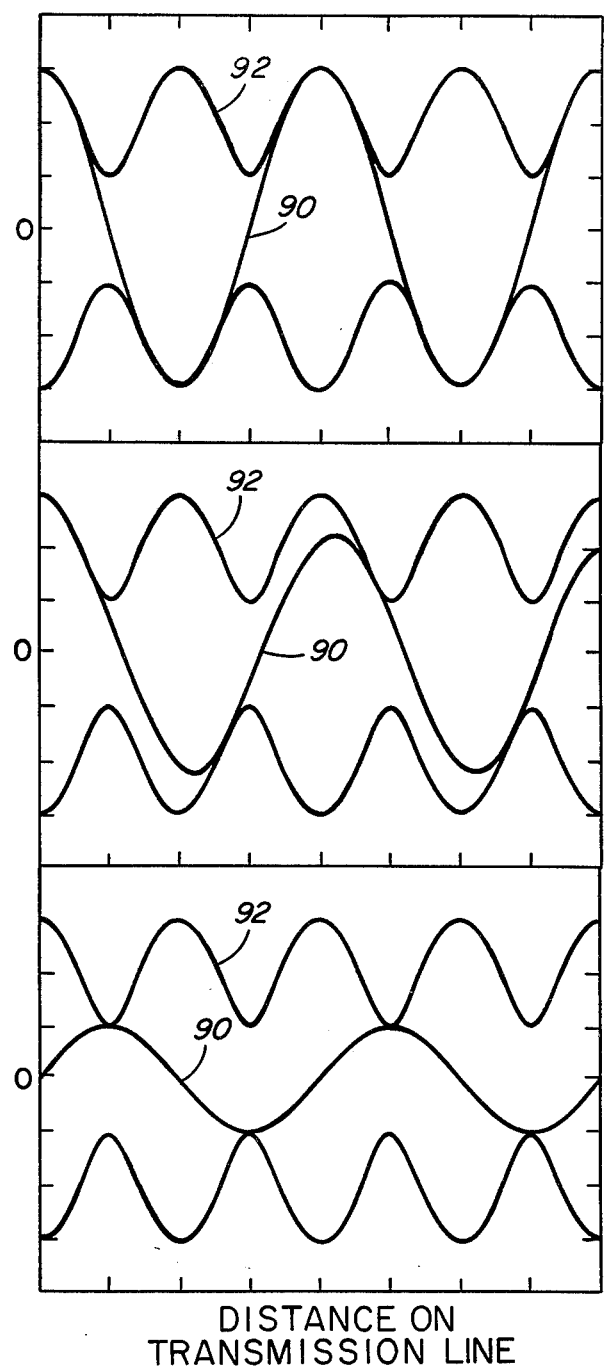
FIG. 12 is a graph of the standing wave pattern and locus of peaks of the standing wave pattern with a 50% reflection coefficient.

This is more clearly illustrated in FIG. 12 which shows the resultant waveform 90 at three successive points in time and the locus of peaks 92 produced by the resultant waveform 90. It should be noted that the locus of peaks 92 has a wavelength which is one half of the wavelength of the resultant waveform 90.

Figure 13:
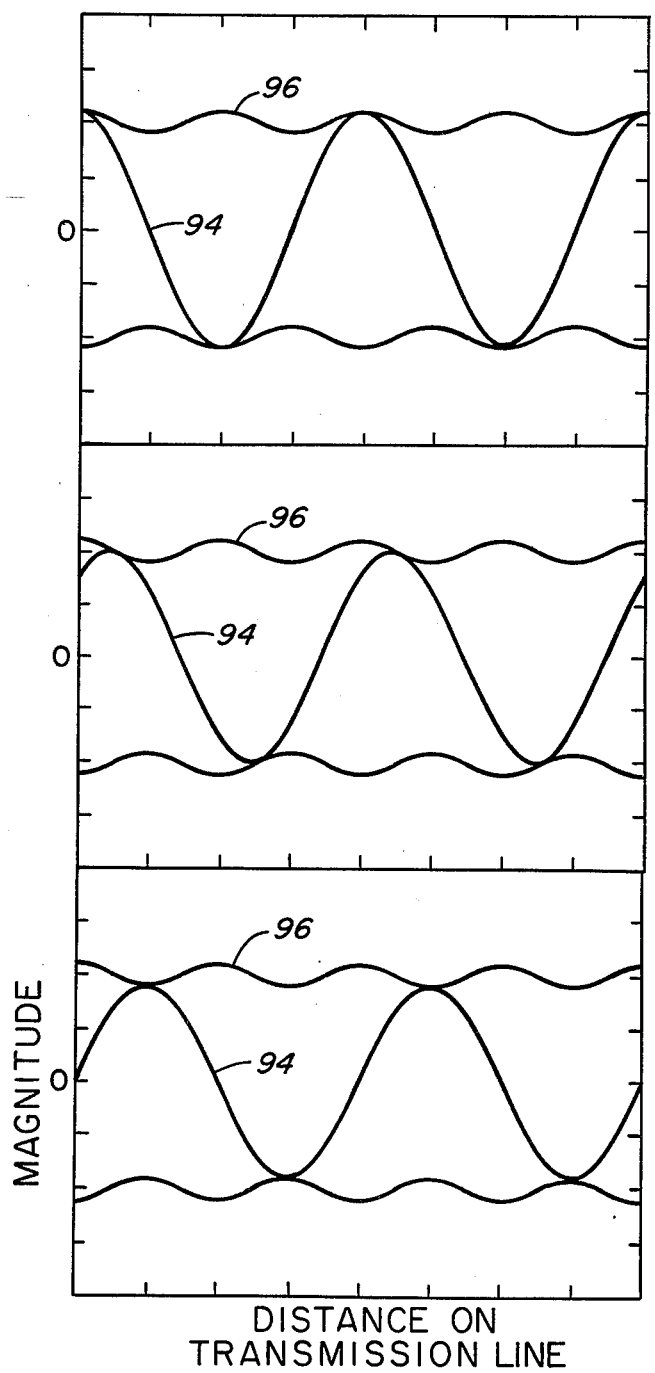
FIG. 13 is a graph of a standing wave pattern and locus of peaks for a 10% reflection coefficient.

FIG. 13 illustrates the resultant waveform 94 produced by the interference of the transmitted wave 89 illustrated in FIG. 7 and a 10% reflected wave 91 illustrated in FIG. 9. The locus of peaks 96 produced by the resultant waveform 94 also has a wavelength equal to one half of the wavelength of the resultant wave and the transmitted and reflected waves.

Figure 14:
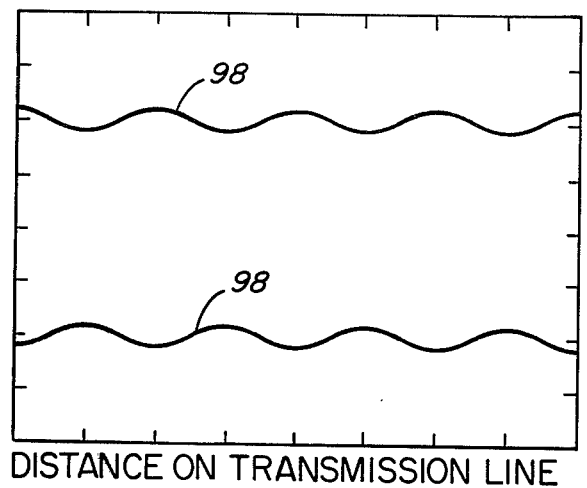
FIG. 14 is a graph of locus of peaks for a 10% reflection coefficient.

FIG. 14 illustrates the locus of peaks 98 which corresponds to locus of peaks 96 illustrated in FIG. 13 which is generated by the interference of the transmitted wave and a 10% reflected wave.

Figure 15:
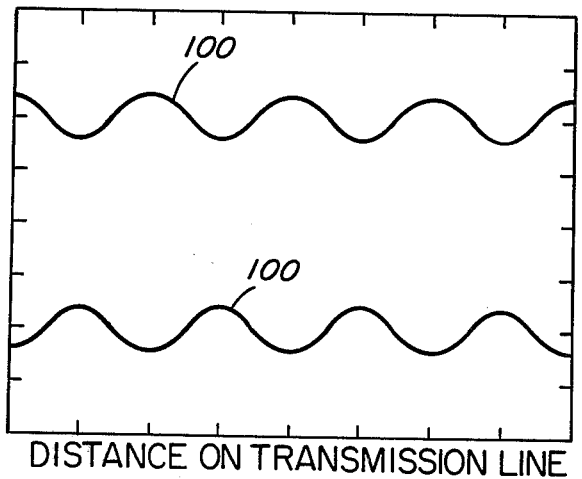
FIG. 15 is a graph of locus of peaks for a 20% reflection coefficient.

FIG. 15 illustrates the locus of peaks 100 produced by a resultant wave which was generated by the interference of the transmitted wave and a 20% reflected wave.

Figure 16:
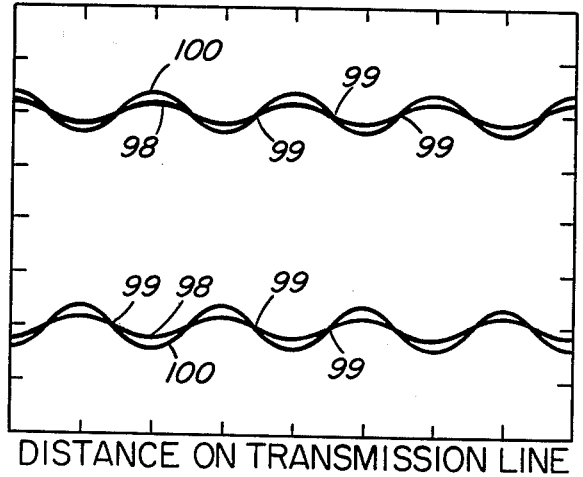
FIG. 16 is a graph of locus of peaks for a 10% reflection coefficient and a 20% reflection coefficient showing ambiguity points each one-quarter wavelength.
Figure 17:
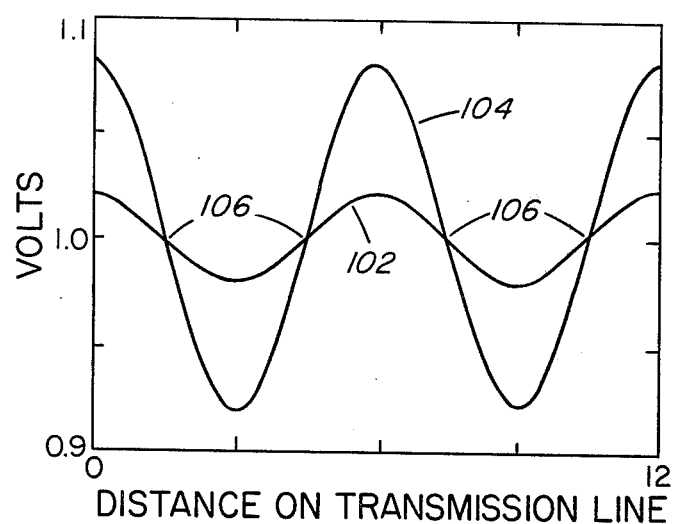
FIG. 17 is a graph of the locus of peaks for an 8% reflection coefficient and locus of peaks for a 2% reflection coefficient illustrating the one-quarter wavelength separation of ambiguity points.
Figure 18:
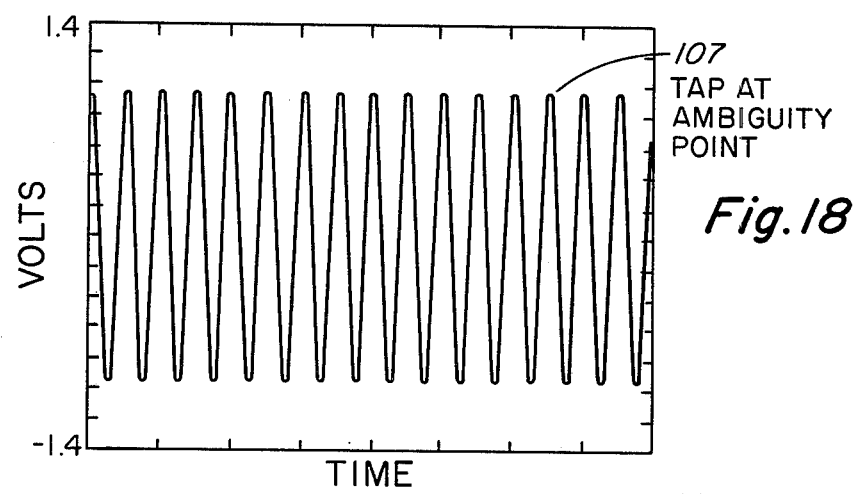
FIG. 18 is a graph of the output at an ambiguity point for changes in reflection coefficient of 20% and 40%.
Figure 19:
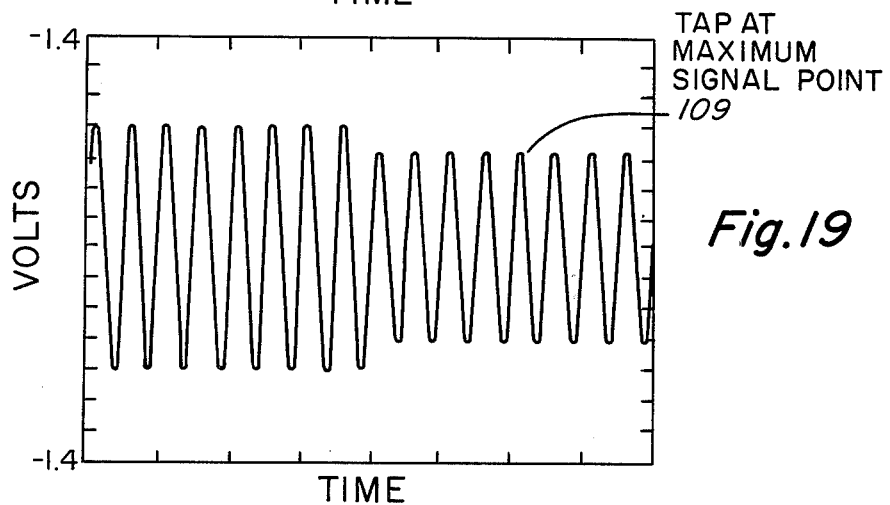
FIG. 19 is a graph of the change in voltage as a function of time for changes in the reflection coefficient from 0.4 to 0.2.

FIG. 16 illustrates the locus of peaks waveform 98 for a 10% reflected wave, as shown in FIG. 14, and the locus of peaks waveform 100 produced by a 20% reflected wave as illustrated in FIG. 15, and the resultant intersection points 99 of these two waveforms. As shown in FIG. 16, the locus of peaks waveforms 98 and 100 intersect at distances equal to substantially ¼ wavelength of the transmitted wave. The intersection points 99 are referred to as ambiguity points or null points. FIG. 17 more clearly illustrates that these ambiguity points or null points occur at intervals which very closely approximate ¼ wavelength in actual implementation of the device of FIG. 1.

FIG. 17 illustrates a locus of peaks 102 for a reflection coefficient of 2% and locus of peaks 104 for a reflection coefficient of 8% between 0.9 volts and 1.1 volts for a 1 volt forward wave. The ambiguity points 106, as clearly shown in FIG. 17, occur at spacings substantially equal to ¼ wavelength of the transmitted wave.

The location of the ambiguity points or null points is extremely important to the operation of the homodyne radar system illustrated in FIG. 1. In operation, the microwave source 10 of FIG. 1 produces a forward traveling wave such as wave 89 illustrated in FIG. 7. Forward wave 89 is applied to tapped transmission line 14 and transmitted by transmitter/receiver antenna 12 to transponder 24. Transponder 24 amplitude modulates the transmitted signal 89 according to a particular code which identifies the particular transponder 24, as disclosed in the above referenced U.S. Pat. No. 4,075,632. In addition to the transponder signal received by transmitter/receiver antenna 12, reflected signals such as the 10% reflected wave 91 illustrated in FIG. 9 are received by the transmitter/receiver antenna 12. The transmitted forward traveling wave signal and the various reflected signals produce resultant waveforms in the tapped transmission line 14.

FIGS. 14 and 15 illustrate the locus of points of the resultant waves for a 10% reflected wave and a 20% reflected wave, respectively. The two waveforms 98 and 100 are shown superimposed upon one another in FIG. 16 as they would appear in tappd transmission line 14 of FIG. 1. As illustrated in FIG. 16, if a detector were placed at the ambiguity points 99 on the tapped transmission line 14, it would be impossible to distinguish between waveforms 98 and 100. Consequently, a detector placed at an ambiguity point along the tapped transmission line 14 would be unable to detect a change in modulation of one of the waveforms 98. This is a result of the fact that the location of the ambiguity points is determined by the phase of the reflected signals and, consequently, the distance of the transponder 24 from the homodyne radar transmitter/receiver device illustrated in FIG. 1, rather than by the magnitude of the reflected signals.

FIG. 17 clearly illustrates that the ambiguity points 106 are separated by substantially ¼ wavelength. Consequently, if at least two channels are placed at a separation equal to approximately ⅛ wavelength, at least one of the two channels will always contain information of the amplitude modulated signal produced by transponder 24. By combining the output of the plurality of channels, a single combined output channel is produced which contains the modulated backscatter signal information from transponder 24.

The operation of the device of the present invention can be described mathematically. The transmitted wave is represented by:

$$V_T = A\cos\left[2\pi\left(ft - \frac{x}{\lambda}\right)\right] \quad (7)$$

while the received wave is represented by:

$$V_R = B\cos\left[2\pi\left(ft + \frac{x}{\lambda}\right) + \theta\right] \quad (8)$$

where λ is the wavelength along the transmission line, and x is the distance along the line. The value of x increases going to the right as illustrated in FIG. 1. The total wave on the tapped transmission line 14 is the sum of the transmitted and received waves.

$$V = V_T + V_R \quad (9)$$

The total wave (V) is the resultant wave illustrated in FIG. 10, FIG. 11 (waveform 90), FIG. 12 (waveform 90), and FIG. 13 (waveform 94). To detect the resultant wave described above, a tap is placed along the transmission line 14 at a location x. The voltage at the tap is:

$$V = A\cos\left[2\pi\left(ft - \frac{x}{\lambda}\right)\right] + B\cos\left[2\pi\left(ft + \frac{x}{\lambda}\right) + \theta\right] \quad (10)$$

the rectified or detected output voltage, $V_o$, is the magnitude of V. In other words:

$$V_o = |V| \quad (11)$$

letting $\rho = B/A$:

$$V_o = A\sqrt{1 + \rho^2 + 2\rho\cos\left(\frac{4\pi x}{\lambda} + \theta\right)} \quad (12)$$

Equation 12 is representative of the locus of peaks illustrated in FIG. 12 (waveform 92), FIG. 13 (waveform 96), FIGS. 14, 15, and 16 (waveforms 98 and 100), and FIG. 17 (waveforms 102 and 104).

If a channel is placed at:

$$x = \lambda\frac{[-\theta + \cos^{-1}(-\rho/2)]}{4\pi} \quad (13)$$

then:

$$V_o = A \quad (14)$$

which is independent of ρ and the magnitude of the scattered signal. In other words, at the locations indicated by Equation 13, the rectified output signal is independent of the modulation coefficient B produced by the transponder 24. These positions are called ambiguity points.

As is apparent from Equation 13, the ambiguity points occur at approximately ¼ wavelength of the placement of the tap along transmission line 14. Information encoded by transponder 14 is unattainable at these ambiguity points.

The present invention overcomes the problems which occur as a result of these ambiguity points by providing a plurality of taps which are spaced by ⅛ wavelength. In practice, ρ is very small. Using this approximation, the ambiguity points occur at:

$$x = \frac{\lambda}{4\pi}\left(\theta + \frac{\pi}{2} + n\pi\right), n = 1, 2, 3, \ldots \quad (15)$$

or, $$x = \frac{\lambda\theta}{4\pi} + \frac{\lambda}{8} + \frac{n\lambda}{4} \quad (16)$$

If a second tap is placed ⅛ wavelength from these ambiguity points, the signal at the second tap is:

$$V_o = A(1+\rho). \quad (17)$$

which is the maximum received signal.

In reality, a large unmodulated received signal is present in addition to the desired modulated signal from the transponder. However, since the homodyne receiver detects changes in the received signal, i.e. changes in $\rho$, the same analysis is directly applicable to the homodyne radar system illustrated in FIG. 1.

Consequently, the present invention provides a homodyne radar transmitter/receiver device which is capable of producing a single output which contains modulated backscatter information for all phase conditions of both modulated and unmodulated backscatter signals. This is achieved using inexpensive techniques which greatly reduce the capital investment in the homodyne radar transmitter/receiver device and which can be implemented in a simple and easy manner.

The foregoing description of the preferred embodiment of the invention has been presented for purposes of illustration and description. It is not intended to be exhaustive or to limit the invention to the precise form disclosed, and obviously many modifications and variations are possible in light of the above teachings. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A homodyne radar transmitter/receiver device comprising:
   microwave source means for producing a microwave transmission signal;
   a combination transmitter/receiver antenna for transmitting said microwave transmission signal and detecting both modulated and unmodulated backscatter signals;
   transmission line means connecting said microwave source and said combination transmitter/receiver antenna;
   at least two output connectors attached to said transmission line means at intervals equal to approximately $\frac{1}{8}$ wavelength of said microwave transmission signal;
   means for detecting attached to said output connectors;
   low pass filter means connected to said means for detecting;
   signal combiner/amplifier means connected to said low pass filter means for producing a single output containing modulated backscatter information for all phase conditions of said modulated and unmodulated backscatter signals.

2. The system of claim 1 wherein said transmission line means comprises a waveguide.

3. The system of claim wherein said transmission line means comprises a stripline.

4. The system of claim 1 wherein said transmission line means comprises a coaxial cable.

5. A homodyne radar transmitter/receiver device comprising:
   microwave source means for producing a microwave transmission signal;
   a combination transmitter/receiver antenna for transmitting said microwave transmission signal and detecting both modulated and unmodulated backscatter signals;
   transmission line means connecting said microwave source and said combination transmitter/receiver antenna;
   at least three output connectors attached to said transmission line means at intervals equal to approximately 1/6 wavelength of said microwave transmission signal;
   means for detecting attached to said output connectors;
   low pass filter means connected to said means for detecting;
   signal combiner/amplifier means connected to said low pass filter means for producing a single output containing modulated backscatter information for all phae conditions of said modulated and unmodulated backscatter signals.

6. In a transponder system, a single antenna homodyne radar system for producing a combined output signal representative of a modulated backscatter signal produced by a transponder regardless of ambiguity points produced by the interference of modulated and unmodulated backscatter signals comprising:
   rf source means for generating a microwave transmission signal;
   antenna means for transmitting said microwave transmission signal and receiving said modulated and unmodulated backscatter signals;
   transmission line means for connecting said rf source means and said antenna means such that a first standing wave pattern is produced in said transmission line means by the combination of said microwave transmission signal and said modulated backscatter signal and a second standing wave pattern is produced in said transmission line means by the combination of said microwave transmission signal and said unmodulated backscatter signal;
   a plurality of output channels connected to said transmission line means, said plurality of output channels spaced by a distance equal to approximately $\frac{1}{8}$ wavelength of said microwave transmission signal such that at least one channel of each adjacent pair of said plurality of output channels contains said received modulated backscatter signal regardless of ambiguity points caused by the coincidence of said first and second standing wave patterns;
   means for combining said plurality of output channels to produce a single combined output channel representative of said modulated backscatter signal.

7. The system of claim 6 wherein said transmission line means comprises a stripline.

8. The system of claim 6 wherein said transmission line means comprises a waveguide.

9. The system of claim 6 wherein said transmission line means comprises a coaxial cable.

10. The system of claim 6 wherein said plurality of output channels comprises two output channels.

* * * * *